March 7, 1950  N. E. AF KLEEN  2,499,736
AIRCRAFT REFRIGERATION
Filed Sept. 6, 1946  4 Sheets-Sheet 1
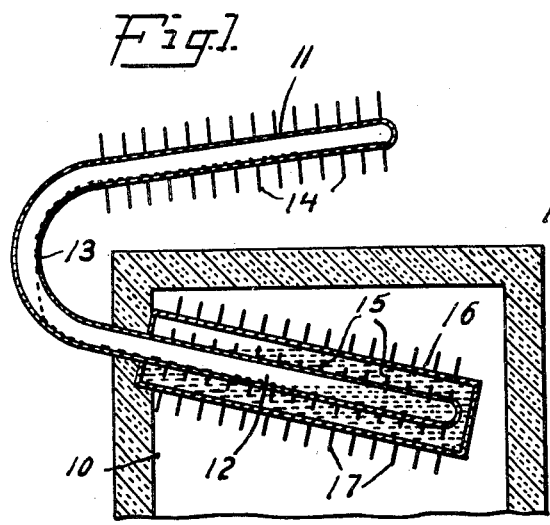
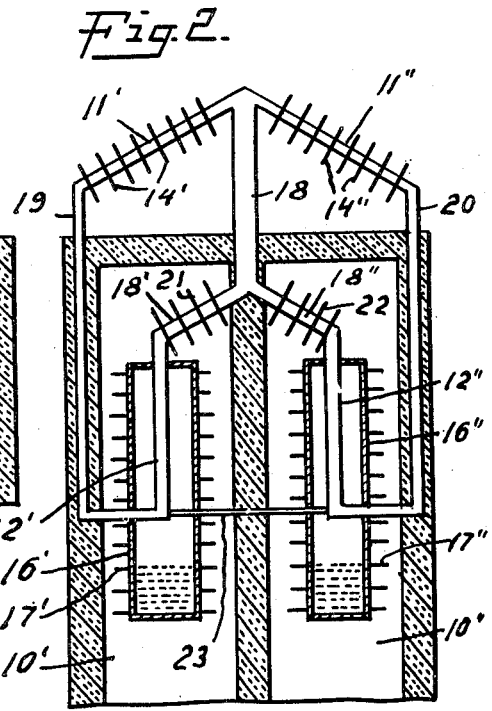
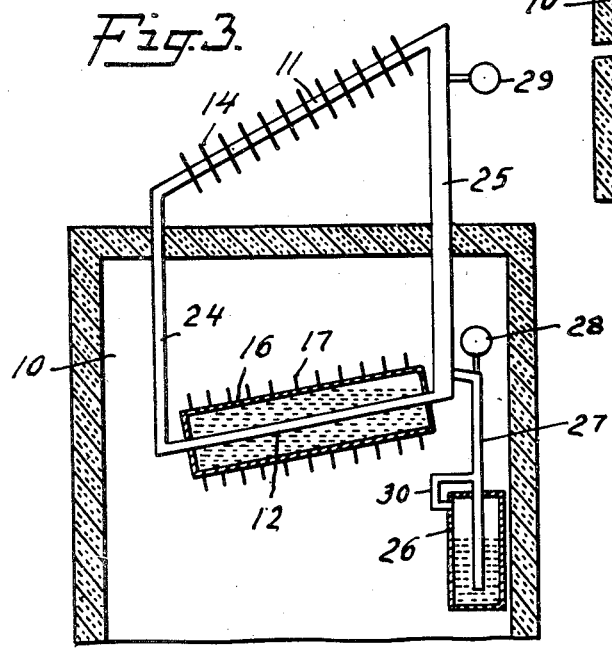
INVENTOR
Nils Erland af Kleen
BY
Pennie, Edmonds, Morton & Barrows
ATTORNEYS March 7, 1950 N. E. AF KLEEN 2,499,736
AIRCRAFT REFRIGERATION
Filed Sept. 6, 1946 4 Sheets-Sheet 2
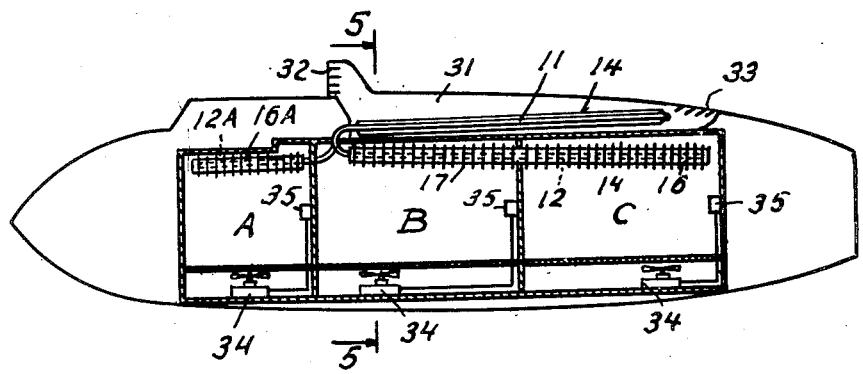
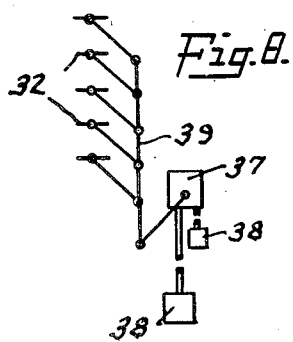
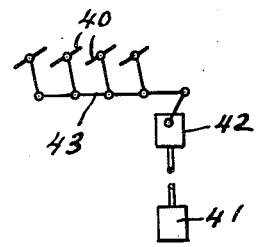
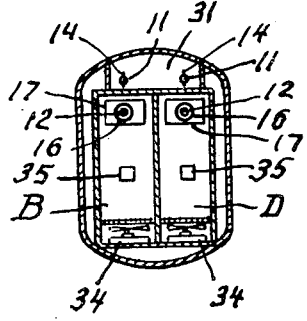
INVENTOR
Nils Erland af Kleen
BY
Pennie, Edmonds, Morton, Barrows
ATTORNEYS March 7, 1950     N. E. AF KLEEN     2,499,736
AIRCRAFT REFRIGERATION
Filed Sept. 6, 1946     4 Sheets-Sheet 3
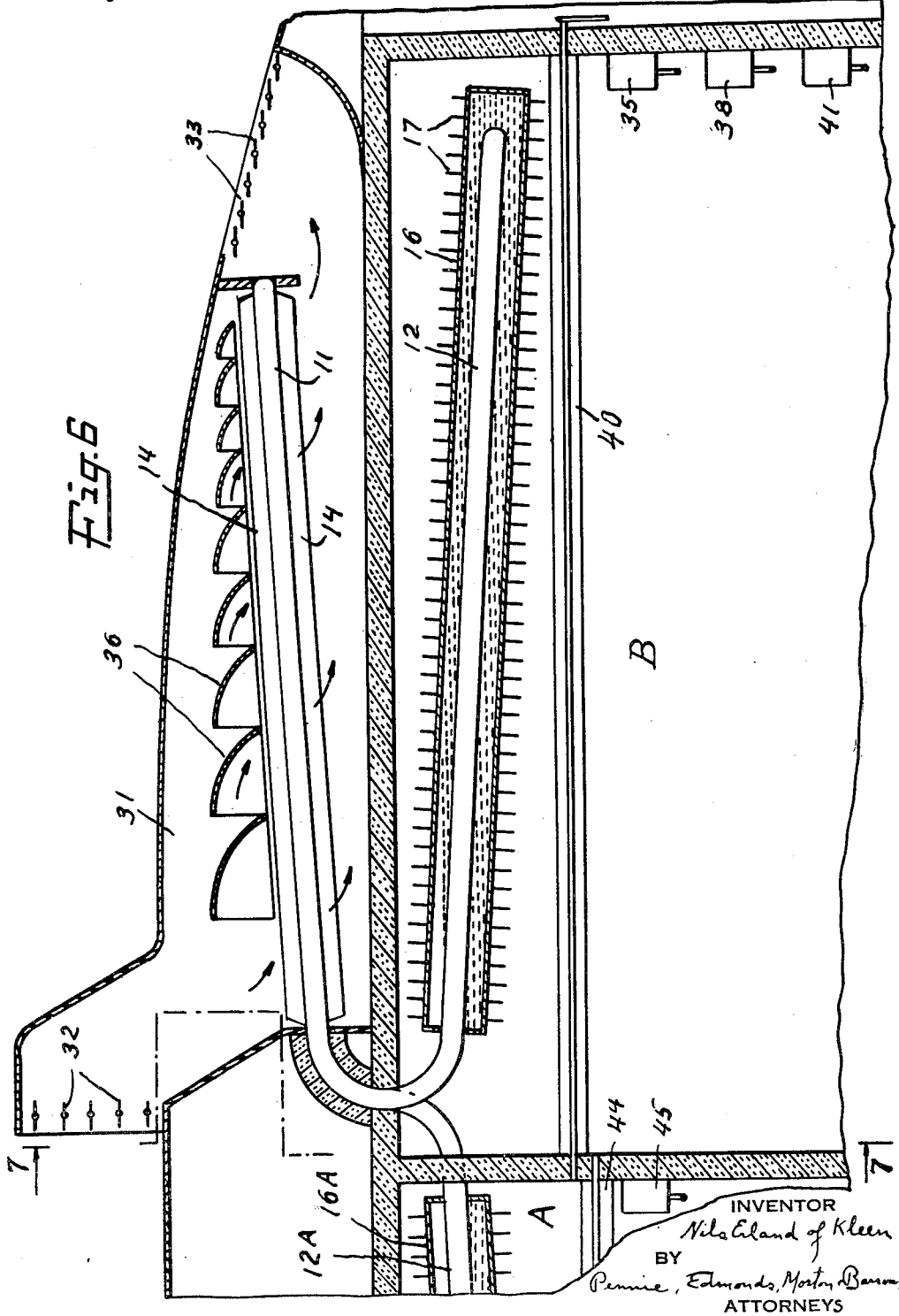
INVENTOR
Nils Eiland af Kleen
BY
Pennie, Edmonds, Morton & Barrows
ATTORNEYS

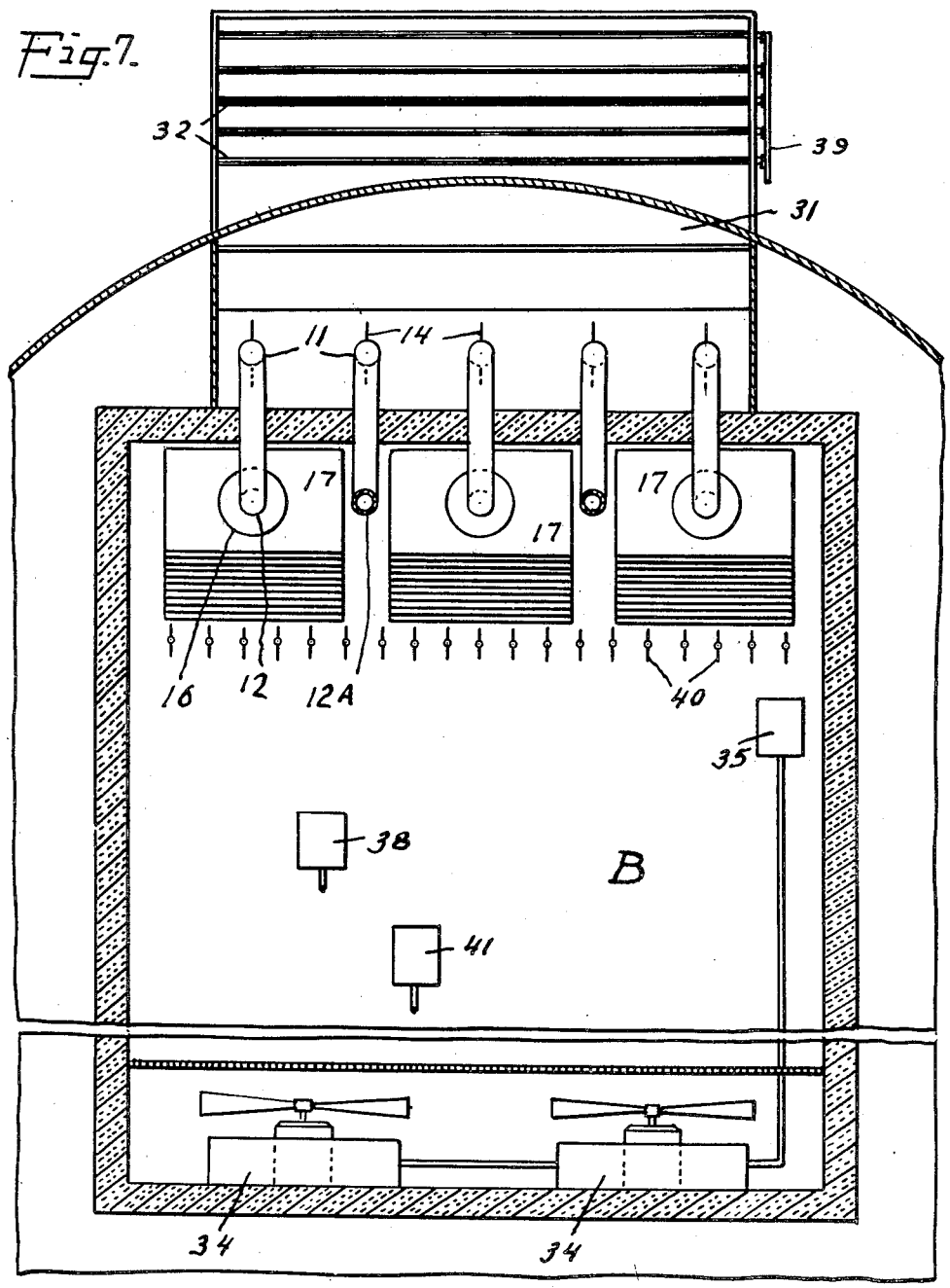

Patented Mar. 7, 1950

2,499,736

UNITED STATES PATENT OFFICE 2,499,736

AIRCRAFT REFRIGERATION

Nils Erland af Kleen, Stockholm, Sweden

Application September 6, 1946, Serial No. 695,144

5 Claims. (Cl. 62—1)

This invention relates to the refrigeration and transportation of perishable commodities or merchandise, and has for its object the provision of an improved method of and apparatus for the refrigeration and transportation within an aircraft of such commodities.

Perishable merchandise, especially foodstuffs, have heretofore been transported by aircraft, and, where necessary, have been preserved by ice or "dry" ice during transit and handling incidental to delivery to and discharge from the aircraft. Such icing involves considerable manual labor, and, in proportion to the amount of merchandise transported, adds a considerable amount of initial extra weight to the aircraft. Moreover, icing rarely produces the optimum conditions of temperature and humidity for the preservation of foodstuffs, and is furthermore inflexible and not adapted to produce the different degrees and conditions of refrigeration most suitable for different commodities. For example, sea food generally requires a temperature of 23 to 30° F., meats a temperature of 34 to 42° F., fresh fruits a temperature of 40 to 45° F. and fresh vegetables a temperature of 40 to 50° F. for safe preservation.

It is a common misconception that aircraft air-conditioning does not require refrigeration simply because airplanes can be flown at a sufficiently high altitude to avoid excessive ambient or outside air temperatures. Moreover, aircraft air-conditioning for passenger travel is not suitable for perishable food preservation, the temperature being too high and the humidity too low. Hence, various proposals have heretofore been made for refrigerating perishable air cargoes, such as vapor compression cooling systems, air expansion turbine systems, "dry" ice etc. None of these expedients has attained any commercial success, and the advantages, economies and commercial possibilities of air cargo transportation of perishable merchandise remain unavailable.

The present invention provides a simple, small, lightweight refrigerating system with no moving parts for aircraft. In its broad aspect, the invention involves, in combination with a heat-insulated cargo space of the aircraft, a thermal exchange system including a vaporizable refrigerating medium or agent hermetically confined within a closed circuit or tube having a liquefying zone or chamber outside the cargo space and a vaporizing zone or chamber thermally associated with the cargo space, a cold accumulator thermally associated with the vaporizing zone and with the cargo space, and means associated with the liquefying zone for directing cooling air thereover while the aircraft is on the ground and in flight. The method of the invention comprises the steps of (1) initially refrigerating the perishable merchandise by extracting heat from the liquefying zone while the aircraft is on the ground and continuing that refrigeration until sufficient cold has been stored in the accumulator to meet the refrigerating requirements within the cargo space in the subsequent ascent of the aircraft to an altitude where the ambient air is sufficiently low in temperature to extract heat from the liquefying zone, (2) continuing refrigeration within the cargo space by the cold accumulator while the aircraft is ascending, (3) maintaining refrigeration while the aircraft is aloft and restoring cold to the accumulator by extracting heat from the liquefying zone by the low-temperature ambient air, and (4) continuing refrigeration while the aircraft is descending to ground by the cold accumulator.

The foregoing and other novel features of the invention will be best understood from the following description taken in conjunction with the accompanying drawings, in which Figs. 1, 2 and 3 are simplified diagrammatic sectional elevations of the thermal exchange system utilized in the invention, Fig. 4 is a vertical longitudinal section of an aircraft embodying the invention, Fig. 5 is a vertical cross section on the section line 5—5 of Fig. 4, Fig. 6 is a vertical longitudinal section of a slightly modified form of the invention, Fig. 7 is a vertical cross section on the section line 7—7 of Fig. 6, and Figs. 8 and 9 are diagrammatic explanatory views of thermostatically controlled shutters for regulating the temperature of the cargo space.

In all the figures of the drawings the heat-insulated cargo space of the aircraft is indicated by reference numeral 10, and the thermal exchange system is shown as a hermetically closed tube or circuit having a liquefying (condensing) zone or chamber 11 outside the cargo space, a vaporizing zone or chamber 12 in thermal relation with the cargo space, and an intermediate connecting section 13. The evacuated tube is partially filled with a vaporizable refrigerating medium (refrigerant), such as ammonia, the charge of refrigerant, completely liquefied, in the tube being from 10 to 20 percent of the total interior volume of the tube. The liquefying and vaporizing zones 11 and 12 are provided with extended heat transfer surfaces or fins 14 and 15, respectively. The vaporizing zone 12 is surrounded by a cold accumulator in the form of a cylindrical chamber 16 spaced from but completely enclosing the vaporizing zone and partially filled with a liquid capable of freezing at temperatures around 32° F. to a solid mass, such for example as water. The exterior cylindrical surface of the chamber 16 is provided with extended heat transfer surfaces 17.

The refrigerant vaporizes in the chamber 12, thereby extracting heat from and cooling the surrounding cold accumulator and hence the cargo space, and the resulting vapor passes into the chamber 11 where it is liquefied or condensed by a sufficiently low-temperature atmosphere surrounding that chamber, and the liquefied refrigerant flows back into the chamber 12. In this manner the refrigerant will circulate as long as the temperature of the atmosphere surrounding the liquefying chamber 11 is lower than the temperature of the vaporizing chamber 12. With the cold accumulator chamber 16 partly filled with water and with no other gas than water vapor present, the water will also vaporize in the chamber 16 so long as the temperature of the cargo space 10 is higher than the temperature of the vaporizing chamber 12. With the liquefying chamber 11 surrounded by a sufficiently low-temperature atmosphere, a rapid heat transfer takes place between the cargo space 10 and the chamber 11, and the cargo space will shortly be brought down to a temperature approximating 32° F. Continued cooling of the chamber 11 will then start freezing of the water in the chamber 16, and all of the water may thus be converted to ice. This will somewhat slow down the transmission of heat from the cargo space 10 to the vaporizing chamber 12. If now the temperature of the atmosphere surrounding the liquefying chamber 11 should increase above the temperature of the cargo space 10, the accumulated cold of the ice in the chamber 16 will hold the temperature of the cargo space, and if this higher atmospheric temperature continues for some length of time, the ice in the chamber 16 will melt, and its stored latent heat will refrigerate the cargo space as long as the ice melts.

By using water and not completely filling the chamber 16, no dangerous pressure will occur on either the interior or exterior wall of the chamber. The chamber 16 is first evacuated until all air has been removed. It is then filled with a volume of pure water of from 80 to 90 percent of the internal volume of the chamber. The evaporation, liquefaction and freezing of the water in the chamber 16 promotes the desired thermal exchange and hence more rapidly cools the cargo space that would be the case with a non-volatile and non-freezing body of liquid in the chamber 16, where only the specific heat of the liquid would be available for heat exchange and cold storage. The location of the cold accumulator as well as the vaporizing chamber within the cargo space insures the utilization of all cold produced in the vaporizing chamber for cooling down and refrigerating the cargo space.

In the practice of the invention, in its broad aspect, the perishable merchandise is suitably packed in the cargo space 10 with the aircraft on the ground. Heat is extracted from the liquefying chamber 11 by any suitable source of local artificial refrigeration, as for example by blowing refrigerated cold air over the chamber. This is continued until the entire body of water in the chamber 16 has been converted to ice, the accumulator being then saturated with cold. The aircraft is then ready for flight, and the cargo space is refrigerated by the cold stored in the accumulator 16 during the ascent of the aircraft to an altitude where the temperature of the ambient air is lower than 32° F., for example around 10 to 25° F. The low-temperature ambient air then flows around the liquefying chamber 11 and maintains the refrigeration of the cargo space, and also restores the cold storage of the accumulator by freezing any water resulting from the melting of the ice during the ascent. As the aircraft descends for landing, the cold accumulator 16 continues the refrigeration of the cargo space from the time the aircraft leaves the low-temperature altitude until the landing and unpacking of the merchandise from the cargo space.

Fig. 2 illustrates an embodiment of the invention in which the circulation of the liquid medium (e. g. water) in the cold accumulator is partly controlled. The cargo space is divided into separate compartments 10' and 10". The vaporizing chambers 12' and 12" are connected at their tops by a common vapor pipe 18 to the liquefying chambers 11' and 11" (provided with cooling fins 14' and 14"), and the liquefied refrigerant is returned to the bottom of the chambers 12' and 12" by connecting pipes 19 and 20, respectively. The cold accumulator chambers 16' and 16" surround the vaporizing chambers 12' and 12", respectively, and extend a substantial distance below the lower ends of those chambers. The chambers 16' and 16" are only partly filled with water, so that no water is in actual contact with the chambers 12' and 12". The transmission of cold from the chambers 12' and 12" to the cargo compartments 10' and 10" is effected mainly by the vaporization of the water by heat from the cargo compartments. The resulting water vapor contacts the cold walls of the vaporizing chambers 12' and 12" and is thereby condensed. The contemplated heat transfer is promoted by fins or the like 17' and 17" on the accumulator chambers 16' and 16", respectively. As the temperature of the vaporizing chambers 12' and 12", as well as of the cargo compartments 10' and 10", decreases to around 32° F., the water vapor will start to freeze around the chambers 12' and 12", and the transmission of cold to the cargo compartments will be thereby greatly decreased, thus preventing the temperature of these compartments falling too low, i. e. below about 32° F. Practically all of the water in the chambers 16' and 16" may thus freeze around the chambers 12' and 12", and it may therefore be desirable to include in the chambers 16' and 16" a small amount of another volatilizable liquid of lower freezing temperature than and immiscible with water, such for example as methyl chloride, in order to provide at all times a circulating heat transfer medium. The depending legs 18' and 18" of the vapor pipe, within the cargo compartments, may be provided with cooling fins or the like 21 and 22, respectively, to produce an additional refrigerating effect. Preferably, the vaporizing chambers 12' and 12" are connected near their lower ends by a pipe 23 to assure that both chambers always have a supply of vaporizable medium, where the rate of vaporization in one chamber is slower than in the other.

In the heat-exchange systems of Fig. 1 and 2, the relatively low heat-conductivity of ice is relied upon to prevent the temperature in the cargo space going too low, that is below about 32° F.

In the system shown in Fig. 3, circulation of the vaporizable refrigerant in its hermetically closed circuit is controlled by the temperature of the cargo space. In Fig. 3, similar parts are indicated by the same reference numerals as in Fig. 1, the liquefying chamber 11 and vaporizing chamber 12 being connected by a liquid-return tube 24 and a vapor tube 25. A closed container 26 positioned within the cargo space 10 is connected to the vapor tube 25 by a tube 27 depending to within a short distance of the bottom of the container 26. A smaller vessel 28, positioned within the cargo space, is connected to the upper end of the tube 27 in open communication with that tube and the vapor tube 25. Advantageously, a second vessel 29, positioned in the ambient atmosphere of the liquefying chamber 11, is connected to the vapor tube 27. A tube 30 connects the upper part of the container 26 with the tube 27. The container 26 is partly filled (to a level below the tube 30) with a liquid capable of absorbing the refrigerant vapor. Where the refrigerant is ammonia, the liquid in the container 26 may be a solution of ammonia in water. The tube 30 permits the circulation of ammonia vapor in the container 26, vapor from the pipe 27 being absorbed by the solution, and evolved vapor returning to the pipe 27 through the pipe 30.

In the simple system of Fig. 1, the pressure within the closed circuit of the refrigerating medium is that of its coldest point, which in operation is the liquefying chamber 11, and hence the pressure within the circuit will correspond to the condensation temperature of ammonia irrespective of the temperature of the vaporizing chamber 12. In the system of Fig. 3, the concentration of the water-ammonia solution in the container 26 is dependent upon its temperature and the pressure within the refrigerating circuit. By including or storing an inert gas such as hydrogen or nitrogen in the vessel 28, the pressure in the vapor side of the refrigerating circuit may be regulated in accordance with the temperature of the cargo space, so that a higher pressure will prevail in the circuit at a higher temperature of the cargo space. Until the cargo space has been brought down to the contemplated low temperature, any higher temperature in that space will cause the inert gas stored in the vessel 28 to increase the pressure in the ammonia circuit, and will also lower the ammonia concentration of the solution in the container 26, thus increasing the condensation of ammonia as well as the amount in circulation. As the cargo space reaches its contemplated low temperature, the inert gas pressure will decrease and the concentration of ammonia in solution will increase, due to the lower temperature surrounding the vessel 28 and container 26, thus decreasing the condensation of ammonia as well as the amount in circulation. The vessel 29 contains a similar inert gas and serves, in much the same way as the vessel 28, to increase the pressure in the ammonia circuit and hence the condensation of ammonia upon an increase in the ambient air temperature surrounding the liquefying chamber 11.

The practical embodiment of the heat exchange system in an aircraft is diagrammatically shown in Figs. 4 and 5, where similar parts are indicated by the same reference numerals as in Fig. 1. The cargo space is shown divided into a number of individual compartments A, B, C and D. Two independent heat exchange systems are shown, one or both of which has a second vaporizing chamber 12A and cold accumulator 16A thermally associated with the cargo compartment or compartments A beneath the cockpit. The liquefying chambers 11 are positioned on top of the aircraft, in the ambient air, within a duct or channel 31 through which the ambient air flows when the aircraft is in flight. Shutters 32 and 33 are provided at the entrance and exit ends, respectively, of the duct for regulating the flow of ambient air through the duct, as for example as hereinafter described. When temperatures higher than about 32° F. are required in one or more cargo compartments, or when the ambient air temperature is too low, the temperature within any cargo compartment may be regulated and controlled by a combination heater and fan 34 positioned below the bottom or floor of the cargo compartment and operatively connected to a thermostat or other temperature responsive device 35 positioned within the cargo compartment. When actuated by conventional thermostatically controlled means, the heater-fan 34 blows warm air through suitable openings in the floor into the cargo compartment and thus the temperature of the compartment is automatically controlled by the thermostat 35.

An enlarged and more detailed showing of the arrangement of the heat exchange system in an aircraft is illustrated in Figs. 6 and 7. Similar parts are indicated by the same reference numerals as in Figs. 4 and 5. The cargo space is divided into two forward compartments A and a large main compartment B. The ambient air duct 31 has an air distributor in the form of louvres 36 above the liquefying chamber assemblies for uniformly distributing the low temperature ambient air throughout the entire length of the liquefying chambers 11. Various expedients for controlling the temperature within individual cargo compartments are shown in Figs. 6 and 7, in addition to the thermostatically controlled heater fans 34, any or all of which may be used as desired or required. Thus, the entrance shutters 32 of the ambient air duct 31 are controlled to vary the amount of air admitted by an actuating mechanism 37 operatively associated with a thermostat or other temperature responsive device 38 positioned within the cargo compartment B (Fig. 8). The pivotally mounted shutters are operatively connected to a common linkage 39 adapted to be operated (to open or close the shutters) by the mechanism 37 when actuated in response to predetermined temperature changes of the thermostat 38. Should the temperature within the cargo compartment fall below a predetermined value, the thermostat 38 will cause the mechanism 37 and cooperating linkage 39 to operate and close, partly or completely, the shutters 32, thereby reducing or completely stopping the flow of low-temperature ambient air over the liquefying chambers 11. If, subsequently, the temperature within the cargo compartment rises above a predetermined value, the thermostat 38 will cause the mechanism 37 to open the shutters 32 and refrigeration will be resumed. If desired, the exit shutters 33 may be similarly thermostatically controlled by the temperature of the cargo compartment to appropriately dampen the flow of low-temperature ambient air through the duct 31.

The shutters 32 and 33 may also be used to reduce the air speed over the condensing surface of the liquefying chambers. At very high air speeds, e. g. when the plane is travelling at high speed, the air friction may unduly heat the condensing surface, and in such event the air speed may be appropriately reduced by partially closing the shutters 32 or 33 or both. Manipulation of the shutters for this purpose may be automatically controlled by a thermostat or the like 38' (Fig. 8) thermally associated with the condensing surface (including the fins 14) of the liquefying chambers 11 and operatively connected to the actuating mechanism 37.

In the arrangement of Figs. 6 and 7, a series of pivoted longitudinal shutters 40 is provided immediately below the cooling assemblies of the vaporizing chambers 12. Normally, these shutters are open, as shown in Fig. 7, and the cargo compartment B is in open and free communication with the cooling assemblies. Should the temperature in the cargo compartment B fall below a predetermined value, a thermostat 41, within the cargo compartment, will cause an actuating mechanism 42 and cooperating linkage 43 to close the shutters 40 (Fig. 9), and thereby shut off the refrigerating effect of the cooling assemblies upon the cargo space. If, subsequently, refrigeration is required within the cargo compartment, the thermostat 41 will respond to that condition and will cause the mechanism 42 and linkage 43 to open the shutters 40. The cargo compartment A is provided with similar shutters 44 automatically operated in response to predetermined temperature changes registered by a thermostat 45.

In practicing the invention in a refrigerated cargo airplane of the construction shown in Figs. 6 and 7 of the drawings, the perishable commodities may be brought to the starting airport in refrigerated trucks or the like and will be packed in suitable cargo compartments. While on the ground at the airport, a local cooling system is used to blow cold air through the duct 31 until the cargo compartments are sufficiently refrigerated and the water in the cold accumulators 16 has been converted to ice. A portable cooling system of the vapor-compressor type may advantageously be used to produce the necessary cold air, but any other cooling system, such for example as "dry" ice may be used. The airplane is now ready to be flown to its destination. Should the plane be held at the airport for some considerable time, because of weather or traffic conditions, the cold accumulator will supply refrigeration to the cargo compartments, and after the take-off and until the plane reaches an altitude at which the ambient air is cold enough for refrigerating purposes, the cold accumulator will continue to supply the necessary refrigeration to the cargo compartments. While in flight at altitudes of low-temperature ambient air, refrigeration is supplied by the flow of the ambient air through the duct 31. The louvres 36 distribute the cold ambient air uniformly over the entire length of the liquefying chambers 11. In addition to the automatic thermostatic control hereinbefore described, the entrance shutters 32 and exit shutters 33 may be manually or otherwise adjusted from within the cockpit or cabin of the plane to regulate the airflow through the duct 31. While in flight, the cold accumulator will again be saturated with cold by freezing of any water melted while standing at the airport and in ascending to a low-temperature altitude. If the airplane is forced to descend before reaching its destination, the cold accumulator will supply refrigeration to the cargo compartments to the limit of its cold storage capacity. Similarly, the cold accumulator will supply refrigeration to the cargo compartments during the descent of the airplane at its destination and until the perishable merchandise has been unloaded, generally into refrigerated trucks for transportation to ultimate markets.

The cold accumulator not only supplies refrigeration at periods when it is impracticable to extract heat from the liquefying chambers but serves additionally as a temperature regulator for the cargo space to be refrigerated. Thus, when saturated with cold, the ice of the cold accumulator acts as a heat insulator and reduces to a practical minimum any heat exchange between the cargo space and the vaporizing chambers of the heat transfer system. Thus, with ice as the medium of heat storage, the temperature in the cargo compartments will not fall below 32° F.

In the absence of the various temperature controls hereinbefore described, the thermal exchange system of the invention tends to refrigerate the cargo space to a temperature of about 32° F., where the cold accumulator is frozen water. Lower cargo space temperatures can be obtained by protracted continuation of thermal exchange, or by the substitution of other bodies of liquid for pure water, as for example salt solutions. Cargo space temperatures higher than 32° F. can be maintained by varying the thermal exchange between the cold accumulator and the cargo space through manipulation of the shutters 40 (or 44) in response to predetermined temperature changes within the cargo space, or through similar manipulation of the shutters 32 or 33 or both of the ambient air duct 31, or by blowing relatively warm air into the cargo space when the temperature of the space falls below a predetermined minimum.

I claim:

1. Apparatus for transporting perishable merchandise comprising the combination with an aircraft having a heat-insulated cargo space, of a thermal exchange system including a vaporizable refrigerating medium within a hermetrically closed circuit, said circuit having a liquefying zone in the ambient air outside the cargo space and a vaporizing zone thermally associated with the cargo space, a cold accumulator thermally associated with said vaporizing zone and with the cargo space, means associated with said liquefying zone for directing ambient cooling air over said liquefying zone while the aircraft is in flight, and means responsive to the occurence of a predetermined minimum temperature within the cargo space for blowing relatively warm air into the space.

2. The method of refrigerating perishable merchandise within the cargo space of an aircraft while the aircraft is grounded, ascending, aloft and descending where the cargo space is adapted to be refrigerated by a thermal exchange system in which a vaporizable refrigerating medium circulates within a hermetically sealed circuit between a liquefying zone in the ambient air outside the cargo space and a vaporizing zone thermally associated with a cold accumulator within the cargo space, which comprises extracting heat from said liquefying zone while the aircraft is grounded to refrigerate the cargo space and store sufficient cold in the accumulator to meet the refrigerating requirements within the cargo space in the subsequent ascent of the aircraft through ambient air too high in temperature to extract heat from said liquefying zone, refrigerating the cargo space by the cold accumulator during the ascent of the aircraft from the ground to an altitude where the ambient air becomes sufficiently low in temperature to extract heat from said liquefying zone, extracting heat from said liquefying zone while the aircraft is aloft at said altitude by the low temperature ambient air to restore the cold extracted from said accumulator during the aircraft's ascent and to maintain refrigeration of the cargo space, and refrigerating the cargo space by the cold accumulator during the descent of the aircraft to the ground from an altitude where the ambient air becomes too high in temperature to extract heat from said liquefying zone.

3. In the method of claim 2, controlling the rate of extracting heat from the liquefying zone while the aircraft is aloft by changes in the temperature within the cargo space.

4. The method of claim 2 in which the thermal exchange medium of the cold accumulator is water and cold is stored in the accumulator in the form of ice.

5. In the method of claim 2, maintaining a predetermined temperature above 32° F. in the cargo space by blowing relatively warm air into the space upon the occurrence of a predetermined minimum temperature within the space.

NILS ERLAND AF KLEEN.

REFERENCES CITED

The following references are of record in the file of this patent:

UNITED STATES PATENTS

| Number | Name | Date |
|---|---|---|
| 1,973,116 | Shutts | Sept. 11, 1934 |

FOREIGN PATENTS

| Number | Country | Date |
|---|---|---|
| 334,696 | Great Britain | Sept. 11, 1930 |
| 887,267 | France | Nov. 9, 1943 |

OTHER REFERENCES

Mark's Handbook For Mechanical Engineers (1930), 3rd ed., McGraw-Hill, New York, N. Y.